(12) United States Patent
Ubelhart

(10) Patent No.: US 11,121,597 B2
(45) Date of Patent: Sep. 14, 2021

(54) HYBRID MODULE INCLUDING ROTOR HAVING COOLANT FLOW CHANNELS

(71) Applicant: Schaeffler Technologies AG & Co. KG, Herzogenaurach (DE)

(72) Inventor: Eric Ubelhart, Orrville, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 316 days.

(21) Appl. No.: 16/058,337

(22) Filed: Aug. 8, 2018

(65) Prior Publication Data

US 2020/0052536 A1 Feb. 13, 2020

(51) Int. Cl.
| | |
|---|---|
| *H02K 1/32* | (2006.01) |
| *H02K 1/27* | (2006.01) |
| *H02K 15/03* | (2006.01) |
| *F16H 41/24* | (2006.01) |
| *H02K 7/10* | (2006.01) |
| *F16H 45/02* | (2006.01) |

(52) U.S. Cl.
CPC ............... *H02K 1/32* (2013.01); *F16H 41/24* (2013.01); *H02K 1/276* (2013.01); *H02K 7/10* (2013.01); *H02K 15/03* (2013.01); *F16H 45/02* (2013.01)

(58) Field of Classification Search
CPC ............ H02K 1/32; H02K 1/27; H02K 15/03; H02K 7/10; H02K 1/276; H02K 7/108; H02K 21/14; F16H 41/24; F16H 45/02
See application file for complete search history.

(56) References Cited

U.S. PATENT DOCUMENTS

| | | | | |
|---|---|---|---|---|
| 4,510,409 A * | 4/1985 | Kanayama | ............... | H02K 1/32 310/268 |
| 6,204,580 B1* | 3/2001 | Kazmierczak | ........... | H02K 3/24 310/216.119 |
| 7,847,456 B2* | 12/2010 | Kori | ........................ | H02K 1/325 310/156.01 |
| 8,076,805 B2* | 12/2011 | Kabata | ..................... | H02K 1/32 310/61 |
| 2009/0058204 A1* | 3/2009 | Sirois | ........................ | H02K 1/32 310/59 |

(Continued)

FOREIGN PATENT DOCUMENTS

| | | |
|---|---|---|
| JP | 2001025209 A | 1/2001 |
| JP | 2009055737 A | 3/2009 |

(Continued)

OTHER PUBLICATIONS

Search Report and Written Opinion for corresponding PCT Application PCT/US2019/045068.

*Primary Examiner* — Naishadh N Desai
(74) *Attorney, Agent, or Firm* — Davidson, Davidson & Kappel, LLC

(57) ABSTRACT

An electric motor includes a rotor rotatable about a center axis. The rotor includes a plurality of magnets and a plurality of radially extending channels extending radially outward from an inner circumferential surface of the rotor to provide fluid to the magnets. A method of constructing an electric motor includes creating a rotor rotatable about a center axis to include a plurality of magnets and a plurality of radially extending channels extending radially outward from an inner circumferential surface of the rotor to provide fluid to the magnets.

19 Claims, 4 Drawing Sheets

(56) References Cited

U.S. PATENT DOCUMENTS

| | | | |
|---|---|---|---|
| 2010/0194220 A1* | 8/2010 | Tatematsu | H02K 1/2766 |
| | | | 310/61 |
| 2015/0084469 A1* | 3/2015 | Yazaki | H02K 1/276 |
| | | | 310/156.53 |
| 2015/0162790 A1* | 6/2015 | Isoda | H02K 1/2766 |
| | | | 310/156.47 |
| 2015/0280525 A1 | 10/2015 | Rippel et al. | |
| 2016/0261158 A1* | 9/2016 | Horii | H02K 1/274 |
| 2017/0054344 A1* | 2/2017 | Larjola | H02K 7/1823 |
| 2017/0331338 A1* | 11/2017 | Asahi | H02K 1/2766 |
| 2018/0062469 A1 | 3/2018 | Satyaseelan et al. | |

FOREIGN PATENT DOCUMENTS

| | | |
|---|---|---|
| JP | 2011254571 A | 12/2011 |
| KR | 1020060093993 A | 8/2006 |

* cited by examiner

HYBRID MODULE INCLUDING ROTOR HAVING COOLANT FLOW CHANNELS

The present disclosure relates generally to electric motor rotors and more specifically to electric motor rotors in hybrid modules.

BACKGROUND

Permanent magnet motors comprise a rotor and a stator. Normally, only the stators are cooled. Magnets in the rotor can become heat soaked because they have little cooling.

SUMMARY OF THE INVENTION

An electric motor includes a rotor rotatable about a center axis. The rotor includes a plurality of magnets and a plurality of radially extending channels extending radially outward from an inner circumferential surface of the rotor to provide fluid to the magnets.

According to embodiments of the electric motor, the channels may extend axially and circumferentially within the rotor. The channels may have a stepped configuration. The rotor may be formed by a plurality of plates stacked in an axial direction. The channels may being formed by a plurality of partially radially overlapping holes formed in the plates. The radially overlapping holes may form the channels by the hole in each consecutive one of the plates in the axial direction being progressively further radially outward from the center axis. The plates may have an identical configuration and are rotationally oriented such that each of the plates has a different rotational orientation than a directly axially adjacent one of the plates. Each of the plates may be rotationally offset from the directly axially adjacent plate by a same angle. Each of the plates may include a plurality of circumferential sectors. Each of the sectors may includes a plurality of the holes. The holes of each circumferential sector may have a different configuration. The plates may have repeating pattern of rotational offset based on a number of the circumferential sectors. Each of the sectors may include a plurality of hole sets. Each of the hole sets may include a same number of the holes of the sector. Each of the hole sets of each of the sectors may have a same configuration that is specific to the respective sector. The rotor may include axially extending channels. The radially extending channels may extend radially outward from the inner circumferential surface of the rotor to the axially extending channels. The axially extending channels may be radially inward from the magnets. The rotor may include connecting slots and magnet receiving slots receiving the magnets. The connecting slots may extend from the axially extending channels to the magnet receiving slots. The magnet receiving slots may be arranged in pairs and each of the pairs may include a first magnet receiving slot and a second magnet receiving slot. The connecting slots may include first connecting slots and second connecting slots and the first connecting slots may extend from the axially extending channels to the first magnet receiving slots and the second connecting slots may extend from the axially extending channels to the second magnet receiving slots such that each of the axially extending channels includes at least one of the first connecting slots and at least one of the second connecting slots extending therefrom. A plurality of the radially extending channels may extend into a same one of the axially extending channels. The plurality of the radially extending channels may extend into the same one of the axially extending channels are axially offset from each other. The electric motor may include a rotor carrier including radially extending holes passing therethrough to provide fluid to the inner circumferential surface of the rotor.

A method of constructing an electric motor includes creating a rotor rotatable about a center axis to include a plurality of magnets and a plurality of radially extending channels extending radially outward from an inner circumferential surface of the rotor to provide fluid to the magnets. The method may include providing a plurality of plates each including a plurality of holes extending axially therethrough. The creating of the rotor may include axially stacking the plurality of plates together such that the holes partially radially overlap to form the radially extending channels

BRIEF DESCRIPTION OF THE DRAWINGS

The present disclosure is described below by reference to the following drawings, in which.

DETAILED DESCRIPTION

The present disclosure provides channels stamped into rotor laminations to provide additional cooling to magnet rotor segments. In one embodiment, the magnet rotor segment are used in an e-motor in a wet hybrid module including a wet engine connect/disconnect clutch. This additional cooling may provide improved e-motor capability by extending higher current run times by reducing heat soaking of the rotor. Reducing rotor operating temperature may enable the use of less expensive magnets by reducing elements added to improve magnetic durability to heat. Less expensive magnets include less Dysprosium than conventional magnets, such as for example conventional widely used Neodymium magnets, or include no Dysprosium. Magnets that include less or no Dysprosium include "Dy free" and "Dy less" neo magnets sold by Magma Magnetic Technologies. In one embodiment, holes are designed so that each lamination—i.e., plate, is rotated 90 degrees before stacking on top of the adjacent lamination. The channels move cooling fluid through rotor stack from an inner diameter (but not in air gap) to as close to magnet corners as possible to remove excess heat.

Figure 1:
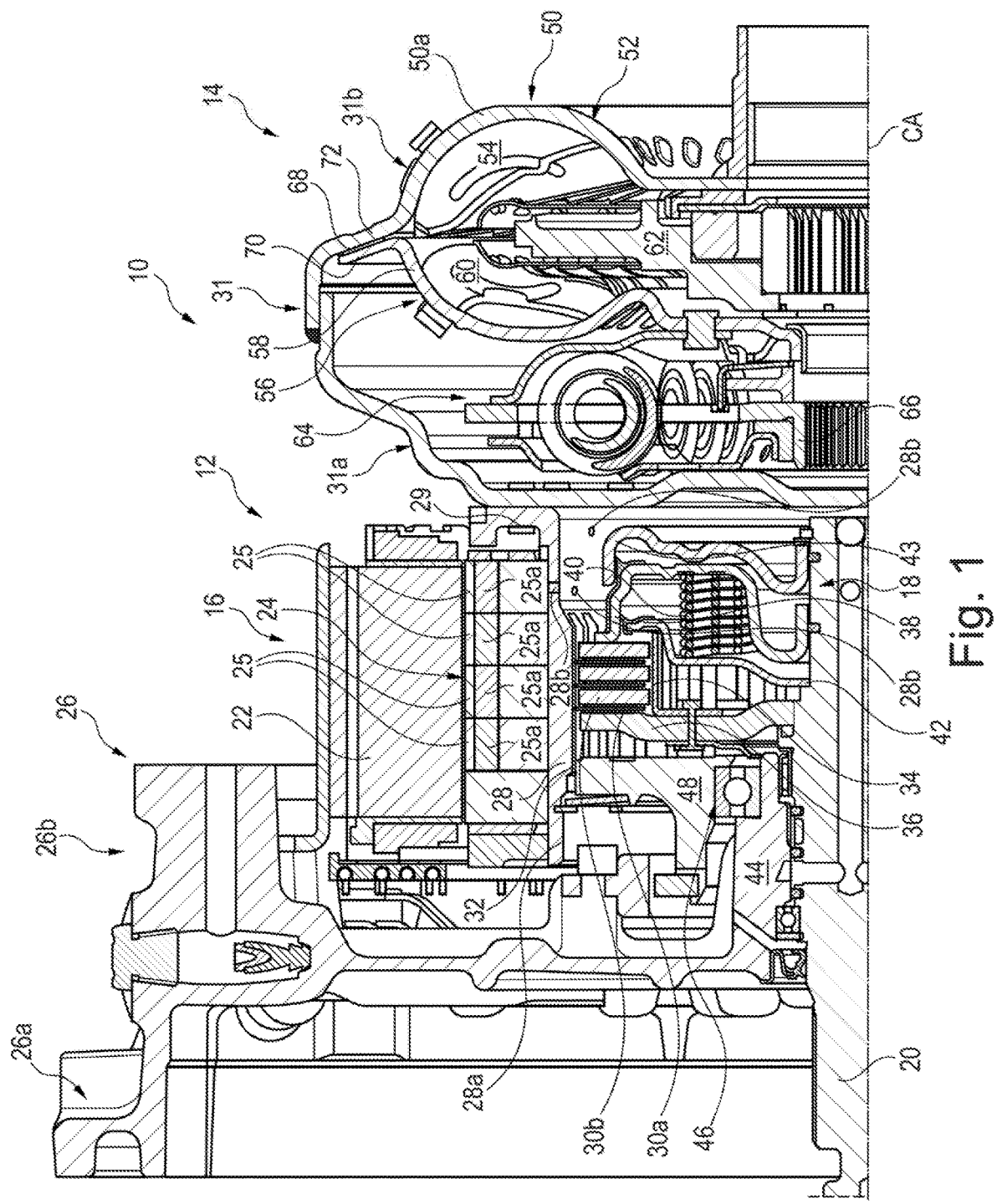
FIG. 1 shows a hybrid module in accordance with an embodiment of the present disclosure.

FIG. 1 shows hybrid module 10 in accordance with an embodiment of the present invention. Module 10 includes a hybrid drive unit 12 configured for attachment to an internal combustion engine and a torque converter 14 configured for attachment to a transmission input shaft. In a known manner, hybrid drive unit 12 is selectively operable to transmit torque from the internal combustion engine to torque converter 14 or directly drive torque converter 14 via an electric motor 16 of drive unit 12. Along these lines, hybrid drive unit 12 includes an engine connect/disconnect clutch 18 for selectively connecting torque converter 14 to an input shaft 20, which is configured for non-rotatably connecting for example via a flywheel to a crankshaft of the internal combustion engine, or disconnecting torque converter 14 from input shaft 20 such that torque converter can be driven solely by electric motor 16.

Electric motor 16 includes a stator 22 and a rotor 24, with stator 22 being fixed to a housing 26 of hybrid drive unit 12 at an axially protruding transmission side flange 26b of housing 26. Housing 26 further includes an axially protruding engine side flange 26a protruding opposite of flange 26b. Upon current being provided to coils of stator 22, rotor 24 is rotated about a center axis CA of hybrid module 10, due to rotor 24 including a plurality of annular rotor segments 25 that each include a plurality of circumferentially space magnets 25a, which in at least some preferred embodiments are permanent magnets, that are energized by the current in the coils. The terms axially, radially and circumferentially as used herein are used with respect to center axis CA. Rotor 24 is non-rotatably fixed at its inner circumferential surface 24a to a rotor carrier 28, which has a cylindrical shape, such that rotor 24 and rotor carrier rotate together about center axis CA Clutch 18 includes a plurality of clutch plates, at least some of which are supported in an axially slidable manner at outer diameter ends thereof by splines 32 formed on an inner circumferential surface 28a of rotor carrier 28. More specifically, the clutch plates include outer splined clutch plates 30a that include outer splines received between splines 32 so plates 30a are supported in an axially slidable manner at the diameter thereof. The clutch plates also include inner splined reaction plates 30b that include inner splines so plates 30b are supported in an axially slidable manner at the diameter thereof by an inner support 34 that is fixed to a counter pressure plate 36, which is nonrotatably fixed to shaft 20. Clutch 18 further includes a piston 38 that is axially slidable along an outer circumference of shaft 20 to engage and disengage clutch 18 based on fluid pressure differences on front and rear sides of piston 38. When piston 38 forces plates 30a, 30b against counter pressure plate 36, clutch 18 is engaged and torque from shaft 20 is transmitted through plates 30a, 30b into rotor carrier 28, which then transmits the received torque to damper assembly 14. Piston 38 is held axially away from plates 30a, 30b by a spring 40 supported by a support plate 42. Piston 38 is also resiliently connected to a liftoff control plate 43 that limits the liftoff of piston 38 with respect to plates 30a, 30b.

Housing 26 includes an axially extending protrusion 44 provided on an engine side of clutch 18 radially outside of shaft 20. Protrusion 44 supports a ball bearing 46, which rotatably supports a rotor flange 48 on protrusion 44. An inner race of ball bearing 46 sits on an outer circumferential surface of protrusion 44 and rotor flange 48 extends from an outer circumferential surface of the outer race of ball bearing 46 to rotor carrier 28.

Torque converter 14 includes a front cover 31a and a rear cover 31b together forming cover 31, with fasteners 29 passing axially through a radially extending section of front cover 31a, which extends radially inward to intersect center axis CA, and through a radially extending portion of rotor carrier 28 to fix cover 31 to rotor carrier 28. Rear cover 31b includes forms an impeller shell 50 of an impeller 52 that includes a plurality of impeller blades 54, which are supported by a rounded blade supporting portion 50a of impeller shell 50, which is shaped as an annular bowl and contacts rear edges of impeller blades 54.

Torque converter 14 also includes a turbine 56 configured to define a piston that is axially moveable toward and away from impeller shell 50 such that an engagement section of turbine 56 engages an engagement section of impeller shell 50 so as to form a lockup clutch. Turbine 56 includes a turbine shell 58 supporting a plurality of turbine blades 60. Torque converter 14 also includes a stator 62 axially between turbine 56 and impeller 52 to redirect fluid flowing from the turbine blades 60 before the fluid reaches impeller blades 54 to increase the efficiency of torque converter 14. Torque converter 14 further includes a damper assembly 64 fixed to turbine shell 58. Damper assembly 64 is configured for receiving torque from turbine shell 58 and transferring torque to the transmission input shaft. For transferring torque to the transmission input shaft, damper assembly 64 includes a support hub 66, which includes a splined inner circumferential surface for non-rotatably connecting to an outer circumferential surface of the transmission input shaft.

A friction material 68 is bonded onto a radially extending impeller facing surface of an outer radial extension 70 of turbine shell 58, which is radially outside of blades 60 and forms the engagement section of turbine 56, for engaging a radially extending wall 72 of impeller shell 50, which is radially outside of blades 54 and forms the engagement section of impeller shell 50. In other embodiments, instead of or in addition to being bonded to outer radial extension 70, friction material 68 may be bonded to radially extending turbine facing surface of radially extending wall 72 or to one or more additional discs between radially extension 70 and wall 72. Regardless of whether friction material 68 is bonded to outer radial extension 70, radially extending wall 72 or one or more additional discs, friction material 68 is provided axially between extension 70 and wall 72 to selectively rotationally engage the engagement section of turbine piston 56 with the engagement section of impeller shell 50. Torque converter 14 receives torque input from hybrid drive unit 12 through fasteners 29 at front cover 31a, which is transmitted to impeller 52. Impeller 52 drives turbine 56 via fluid flow from impeller blades 54 to turbine blades 60, when the lockup clutch is disengaged, or via friction material 68, when the lockup clutch is engaged. Turbine 56 then drives damper assembly 64, which in turn drives the transmission input shaft.

Figure 2:
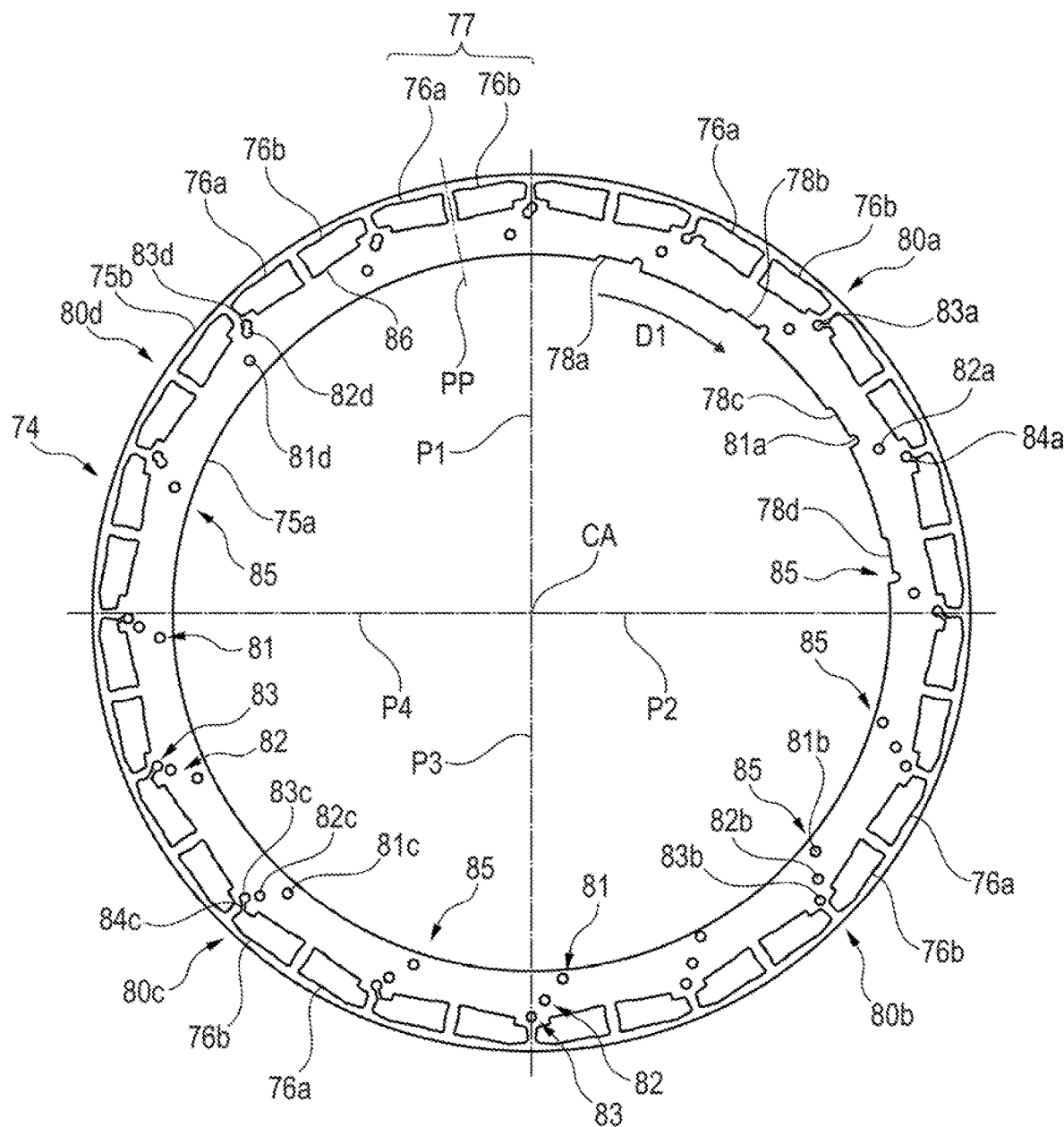
FIG. 2 shows a plan view of a plate that is stacked together with other plates of the same configuration to form rotor segments of the hybrid module shown in FIG. 1.
Figure 3:
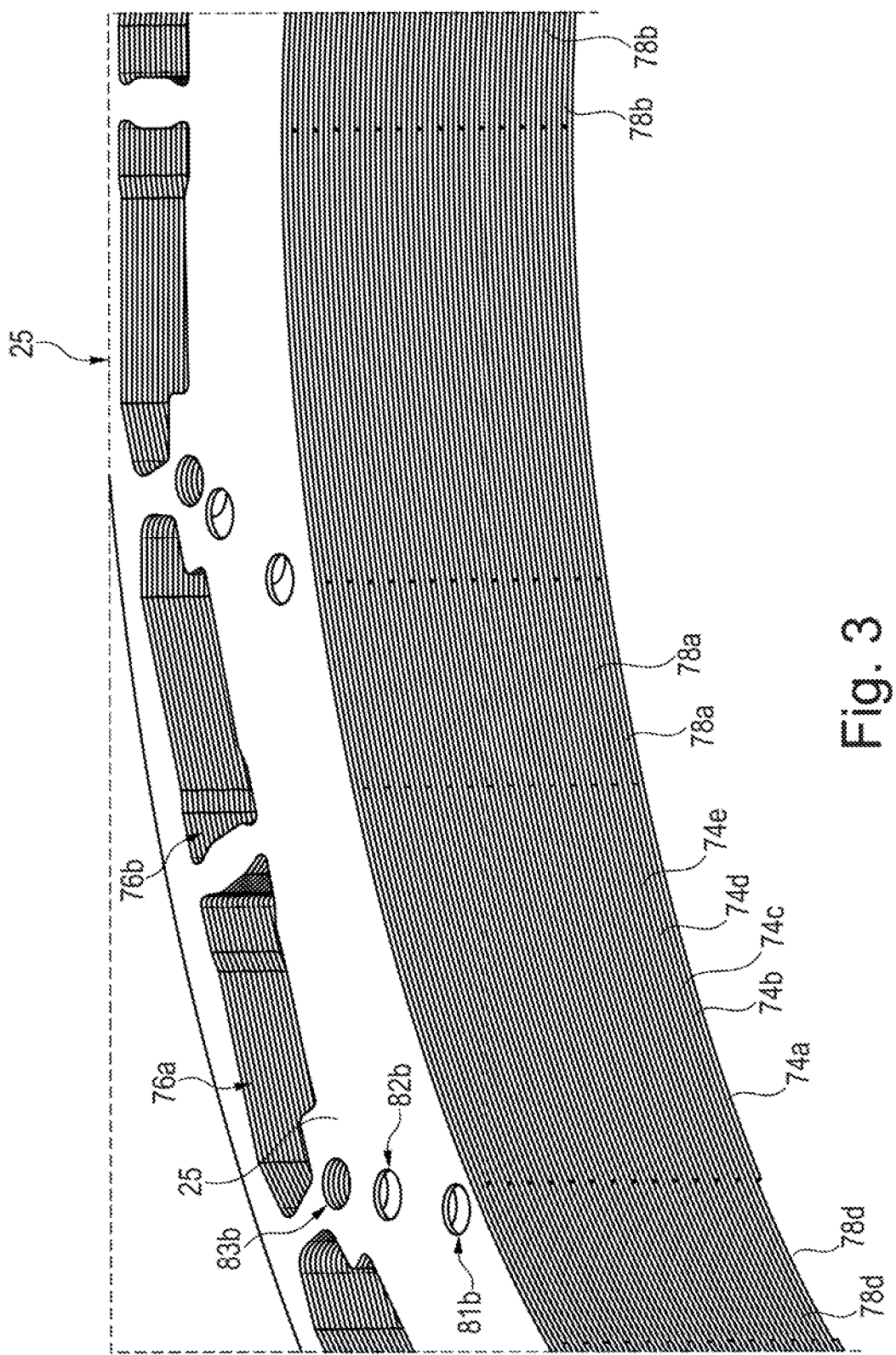
FIG. 3 shows a perspective view of a circumferential portion of one of rotor segments shown in FIG. 2.
Figure 4:
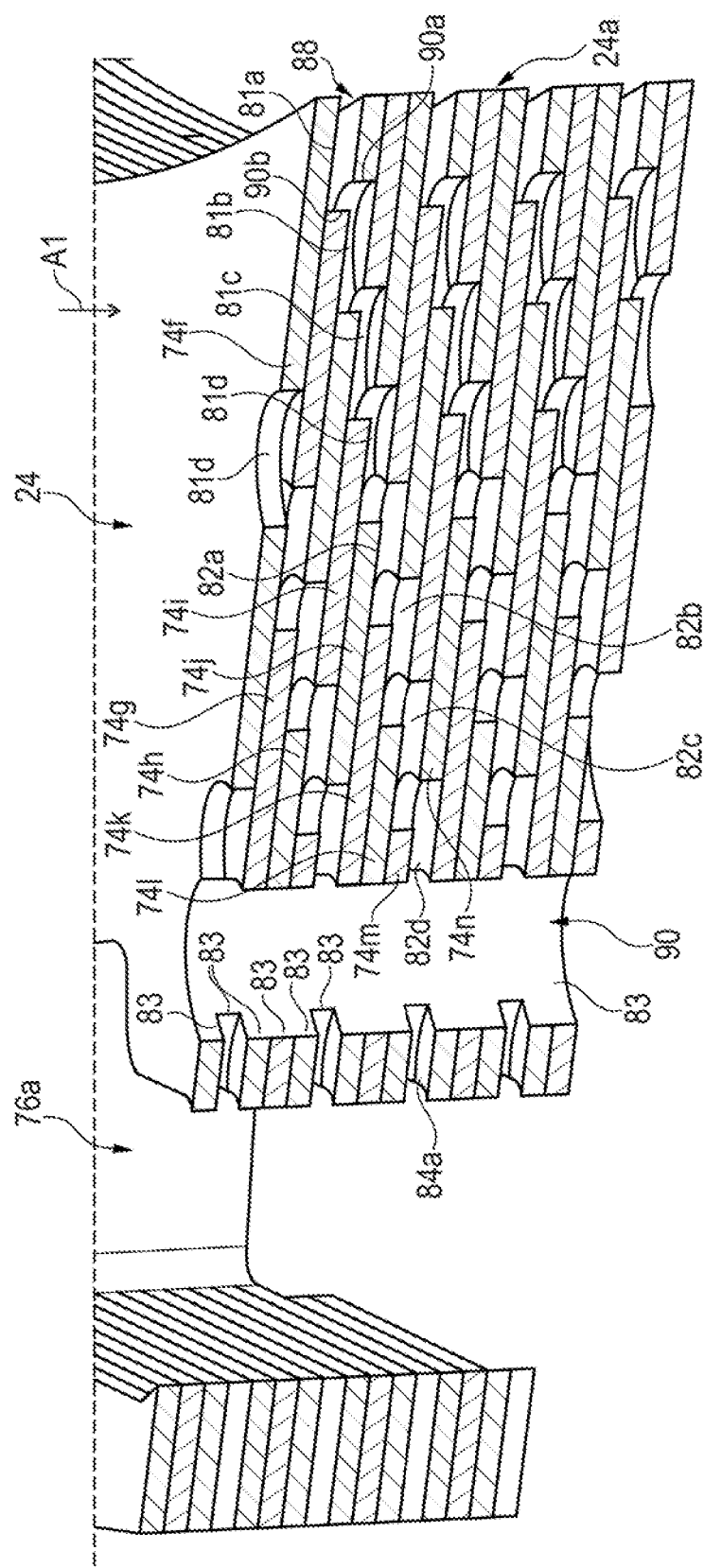
FIG. 4 shows a circumferential cross-sectional view of a plurality of stacked plates of an axial portion of one of rotor segments.

FIGS. 2 to 4 shows details of how rotor segments 25 are formed in accordance with an embodiment of the present disclosure. FIG. 2 shows a plan view of a plate 74 that is stacked together with other plates 74 of the same configuration to form rotor segments 25. FIG. 3 shows a perspective view of a circumferential portion of one of rotor segments 25. FIG. 4 shows a circumferential cross-sectional view of a plurality of stacked plates 74 of an axial portion of one of rotor segments 25.

FIG. 3 shows a plurality of plates 74 stacked together to form a single rotor segment 25. In the embodiment shown in FIG. 4, rotor segment is formed of forty-eight plates 74 stacked axially on top of each other. FIG. 4 shows only an axial portion of the plates 74 shown in FIG. 3, and provides an enlarged view of sixteen plates 74.

As shown in FIG. 2, each plate 74 includes an inner circumferential surface 75a and an outer circumferential surface 75b. Between surfaces 75a, 75b, plate 74 includes a plurality of circumferentially spaced slots 76a, 76b for receiving magnets 25a. Slots 76a, 76b are arranged in pairs 77, with each pair of slots including one slot 76a and one slot 76b, with each slot 76a being mirror symmetrical with respect to the slot 76b of the same pair 77. More specifically, each pair 77 is divided by a respective pair plane PP passing through surfaces 75a, 75b and between slots 76a, 76b of the pair 77, and slots 76a, 76b of each pair 77 are mirror symmetrical to each other with respect to pair plane PP. In the embodiment shown in FIG. 2, there are sixteen pairs 77 of slots 76a, 76b. Plate 74 includes a plurality of elongated holes 78a, 78b, 78c, 78d extending into inner circumferential surface 75a. In the embodiment shown in FIG. 2, plate 74 includes four elongated holes 78a, 78b, 78c, 78d, with all of elongated holes 78a, 78b, 78c, 78d being formed in a same ninety degree sector 80a of plate 74. Elongated holes 78a, 78b, 78c, 78d are elongated in the circumferential direction to provide an enlarged inlet in inner circumferential surface 74a for receiving the fluid.

To form channels in rotor segments 25, each plate 74 is provided with a plurality of holes 81, 82, 83. The holes 81, 82, 83 are arranged in sets 85, with each set 85 including three holes 81, 82, 83 that are progressively further from inner circumferential surface 75a. More specifically, each set 85 includes a first hole 81 that is closer to surface 75a than holes 82, 83, a second hole 82 that is closer to surface 75a than hole 83, and a third hole 83 that is further from surface 75a than holes 81, 82. Each hole set 85 follows a path extending circumferentially in a circumferential direction D1 while extending radially outward. More specifically, each hole 82 is offset circumferentially from the corresponding hole 81 of the same set 85 in direction D1 and each hole 83 is offset circumferentially from the corresponding hole 82 of the same set 85 in direction D1. Each of holes 83 is positioned between two sets 77 of slots 76a, 76c, with a radially inner most edges 86 of slots 76a, 76b being further radially inward than at least a portion of each of holes 83.

Plate 74 is formed to include a plurality of sectors—a first sector 80a, a second sector 80b, a third sector 80c, a fourth sector 80d of the same circumferential length. In the embodiment shown in FIG. 2, plate 74 includes four sections 80a, 80b, 80c, 80d of the same circumferential length, with each sector 80a, 80b, 80c, 80d being a ninety degree span. In other words, sector 80a is delimited by two planes P1, P2 extending from center axis CA perpendicular to each other through plate 74, sector 80b is delimited by two planes P2, P3 extending from center axis CA perpendicular to each other through plate 74, sector 80c is delimited by two planes P3, P4 extending from center axis CA perpendicular to each other through plate 74 and sector 80d is delimited by two planes P4, P1 extending from center axis CA perpendicular to each other through plate 74.

In the embodiment shown in FIG. 2, each sector 80a, 80b, 80c, 80d includes a plurality of hole sets 85, and the hole sets 85 each have a configuration that is the same as other hole sets 85 in the respective sector 80a, 80b, 80c, 80d, such that all of the hole sets 85 of a respective sector 80a, 80b, 80c, 80d are in a same radial position. More specifically, all of holes 81 of the respective sector 80a, 80b, 80c, 80d are a same distance from inner circumferential surface 75a, all of holes 82 of the respective sector 80a, 80b, 80c, 80d are a same distance from inner circumferential surface 75a and all of holes 83 of the respective sector 80a, 80b, 80c, 80d are a same distance from inner circumferential surface 75a. Holes 81, 82, 83 of sector 80a are denoted as holes 81a, 82a, 83a; holes 81, 82, 83 of sector 80b are denoted as holes 81b, 82b, 83b; holes 81, 82, 83 of sector 80c are denoted as holes 81c, 82c, 83c; and holes 81, 82, 83 of sector 80d are denoted as holes 81d, 82d, 83d.

In the embodiment shown in FIG. 2, sectors 80a, 80b, 80c, 80d each have hole sets 85 that have a configuration that is different from hole sets 85 of the other sectors 80a, 80b, 80c, 80d. More specifically, holes 81a, 81b, 81c, 81d are different radially distances from inner circumferential surface 75a. Beginning with sector 80a, following direction D1 and ending in sector 80d, 81a, 81b, 81c, 81d are positioned radially further from inner circumferential surface 75a with each sequential sector 80a, 80b, 80c, 80d. In other words, holes 81b of sector 80b are further radially outward than holes 81a of sector 80a, holes 81c of sector 80c are further radially outward than holes 81b of sector 80b, and holes 81c of sector 80d are further radially outward than holes 81c of sector 80c. Each of holes 81a in sector 80a intersects one of elongated holes 78a, 78b, 78c, 78d.

Similarly, holes 82a, 82b, 82c, 82d are different radially distances from inner circumferential surface 75a in each of sectors 80a, 80b, 80c, 80d. Beginning with sector 80a, following direction D1 and ending in sector 80d, holes 82a, 82b, 82c, 82d are positioned radially further from inner circumferential surface 75a with each sequential sector 80a, 80b, 80c, 80d. In other words, holes 82b of sector 80b are further radially outward that holes 82a of sector 80a, holes 82c of sector 80c are further radially outward that holes 82b of sector 80b and holes 82d of sector 80d are further radially outward that holes 82c of sector 80c.

Additionally, all of holes 83a, 83b, 83c, 83d are the same radial distance from inner circumferential surface 75a in each of sectors 80a, 80b, 80c, 80d. Accordingly, beginning with sector 80a, following direction D1 and ending in sector 80d, holes 82a, 82b, 82c, 82d are radially closer to the corresponding holes 83a, 83b, 83c, 83d of the same set 85 in each sequential sector 80a, 80b, 80c, 80d, with holes 82d of sector 80d intersecting holes 83d.

Plate 74 is also configured such that each of holes 82a in sector 80a intersects one of elongated holes 78a, 78b, 78c, 78d. Each of holes 83a in sector 80a merges with of one of slots 76a via a connecting slot 84a and each of the holes 83c in sector 80c merges with of one of slots 76b via a connecting slot 84c. In contrast, each of holes 83b in sector 80b and each of the holes 83d in sector 80d are distinct from and do not merge with any of slots 76a, 76b.

Referring to FIG. 3, rotor segment 25 includes sixty four plates 74 of identical configuration stacked on top of each other. Each plate 74 is rotated ninety degrees in comparison with the directly axially adjacent plate 74. A bottom plate 74a in the view of FIG. 3 includes an elongated hole 78d in the portion shown in FIG. 3. A plate 74b directly axially adjacent to plate 74a is rotated ninety degrees in direction D1 in comparison with plate 74a such that an elongated hole 78a and an elongated hole 78b of plate 74 are included in the portion shown in FIG. 3. A plate 74c directly axially adjacent to plate 74b is rotated ninety degrees in direction D1 in comparison with plate 74b and a plate 74d directly axially adjacent to plate 74c is rotated ninety degrees in direction D1 in comparison with plate 74c such that no elongated holes 78a, 78b, 78c, 78d are visible in the portion of plates 74c, 74d shown in FIG. 3. Next, a plate 74e directly axially adjacent to plate 74d and rotated ninety degrees in direction D1 in comparison with plate 74d is in the exact same rotational orientation as plate 74a, such that elongated hole 78d of plate 74a is directly axially aligned with elongated hole 78d of plate 74d. Accordingly, plates 74 are rotationally oriented such that plates form a repeating pattern wherein each plate 74 has the same rotational orientation as the plate 74 four plates 74 in the sequence along a first axial direction and/or the same rotational orientation as the plate 74 four plates 74 following the plate 74 in the sequence along a second axial direction. It should be noted that each plate 74 may include different number of sectors other than four, with the repeating pattern of rotational orientation being based on the number of sectors.

Plates 74 are rotationally oriented such that the sector 80a of each plate 74 is aligned with the sector 80d of a directly adjacent plate 74 in a first axial direction and is aligned with the sector 80b of a directly adjacent plate 74 in a second axial direction; the sector 80b of each plate 74 is aligned with the sector 80a of the directly adjacent plate 74 in the first axial direction and is aligned with the sector 80c of the directly adjacent plate 74 in the second axial direction; the sector 80c of each plate 74 is aligned with the sector 80b of the directly adjacent plate 74 in the first axial direction and is aligned with the sector 80d of the directly adjacent plate 74 in the second axial direction; and the sector 80d of each plate 74 is aligned with the sector 80c of the directly adjacent plate 74 in the first axial direction and is aligned with the sector 80a of the directly adjacent plate 74 in the second axial direction.

FIG. 4 illustrates how the holes 81, 82, 83 of plates 74 are aligned with one another to form channels 88 extending from inner circumferential surface 24a of rotor 24 to slots 76a, 76b for receiving magnets 25a to provide coolant for cooling magnets 25a. FIG. 4 illustrates one channel 88 extending all the way from inner circumferential surface 24a to a slot 76a, and portions of other channels 88, at least most of which would extend all the way from in inner circumferential surface 24a to one of slots 76a, 76b in the final construction of rotor 24. Channels 88 extend radially, axially and circumferentially from inner circumferential surface 24a to magnets 25a and have a stepped configuration. Radially overlapping holes form the channels 88 by the hole in each consecutive one of the plates 74 in the axial direction being progressively further radially outward from the center axis.

The cross-section shown in FIG. 4 illustrates a sector 80d of a top plate 74f, with a hole 81d being spaced radially from inner circumferential surface 24a. A next plate 74g in a first axial direction A1 from top plate 74f includes a sector 80a in the illustrated cross-section, with a hole 81a being fluidly joined to inner circumferential surface 75a by one of elongated holes 78a to 78d. A next plate 74h in a first axial direction A1 from plate 74g includes a sector 80b in the illustrated cross-section, with a hole 81b being directly fluidly joined to hole 81a. As shown, due to hole 81b being spaced further radially outward from inner circumferential surface 24a than hole 81a and an innermost diameter 90a of hole 81b being further radially inward than an outer most diameter 90b of hole 81a such that hole 81a of plate 74g and hole 81b of plate 74h partially radially overlap to form a stepped fluid connection. Hole 81a of plate 74g and hole 81b of plate 74h also partially circumferentially overlap. The next two plates 74i, 74j include respective holes 81c, 81d that continue a pattern of partial radial overlap to extend the stepped fluid connection of holes 81a, 81b, with hole 81c partially radially overlapping hole 81b, and with hole 81d partially radially overlapping hole 81c.

A next plate 74k, which is in the exact same rotational orientation as plate 74g, includes a hole 82a in sector 80a that partially radially overlaps with hole 81d of plate 74j. The next three plates 74l, 74m, 74n include respective holes 82b, 82c, 82d that continue a pattern of partial radial overlap to extend the stepped fluid connection of holes 81a, 81b, 81c, 81d, 82a, with hole 82b partially radially overlapping hole 82a, with hole 82c partially radially overlapping hole 82b and with hole 82d partially overlapping holes 82c. Hole 82d of plate 74n merges with hole 83d of plate 74n to merge stepped channel 88 with an axially extending through channel 90. Channel 90 is formed by holes 83—i.e., holes 83a, 83b, 83c, 83d (FIG. 2)—of all of the plates 74 of rotor 24 being directly axially aligned with each other. A plurality of axially spaced connecting slots 84a, which are formed in every fourth plate 74, then connect channel 90 to slot 76a.

As illustrated by FIGS. 2 to 4, holes 81, 82 of each of sectors 80a, 80b, 80c, 80d of a plurality of plates 74—eight plates 74 in the embodiment shown in FIGS. 2 to 4, or two sets of identically aligned patterns of four plates—partially radially overlap to form, with the help of elongated holes 78a, 78b, 78c, 78d, channels 88 fluidly connecting inner circumferential surface 24a of rotor 24 with axially extending channel 90, which is then fluidly connected to slot 76a by a plurality of connecting slots 84a. Connecting slots 84c also extend from channels 90 in an opposite circumferential direction as connecting slots 84c so that connecting slots 84c fluidly connect channels 90 to slots 76b. Accordingly, referring to FIGS. 2 and 4 together, plates 74i and 74m each include a connecting slot 84c that are not visible in FIG. 4 that fluidly connect channel 90 to a slot 76b. Thus, each axially extending channel 90 receives fluid from a plurality of stepped channels 88 and provides fluid to one magnetic receiving slot 76a via a plurality of axially spaced connecting slots 84a and to one magnetic receiving slot 76b via a plurality of axially spaced connecting slots 84b.

Stepped channels 88 are formed to extend axially, circumferentially and radially from inner circumferential surface 24a to axially extending channels 90 such that the centrifugal forces generated during the rotation of components of hybrid module 10 cause fluid, which in preferred embodiments is automatic transmission fluid (ATF), to flow through inner circumferential surface 24a of rotor 24 into magnet receiving slots 76a, 76b to cool magnets 25a. Referring back to FIG. 1, ATF flows radially outward from clutch 18 through radially extending through holes 28b in rotor carrier 28 to inner circumferential surface 24a of rotor 24, where the ATF enters channels 88. Each rotor segment 25 is only 5 degrees offset in the stack, such that end regions of slots 76a and 76b overlap slightly between rotor segments. Coolant will flow through the slotted hole path by the laminations to the magnets slots 76a, 76b then travels axially along the rotor segments 25 out to either end of the entire rotor stack and get sprayed onto coils of stator 22.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

LIST OF REFERENCE NUMERALS

CA center axis
PP slot pair plane
P1, P2, P3, P4 sector planes
D1 circumferential direction
A1 axial direction
10 hybrid module
12 hybrid drive unit
14 torque converter
16 electric motor
18 engine connect/disconnect clutch
20 input shaft
22 stator
24 rotor
24a inner circumferential surface
25 rotor segments
25a magnets
26 housing
26a axially protruding engine side flange 26b axially protruding transmission side flange
26c radially extending housing section
28 rotor carrier
28a inner circumferential surface
28b radially extending through holes
29 fasteners
30a outer splined clutch plates
30b outer splined reaction plates
31 cover
31a front cover
31b rear cover
32 splines
34 inner support
36 counter pressure plate
38 piston
40 spring
42 support plate
43 liftoff control plate
44 housing protrusion
46 ball bearing
48 rotor flange
50 impeller shell
50a rounded blade supporting portion
52 impeller
54 impeller blades
56 turbine
58 turbine shell
60 turbine blades
62 stator
64 damper assembly
66 support hub
68 friction material
70 outer radial extension
72 radially extending wall
74, 74a to 74n rotor plate
75a inner circumferential surface
75b outer circumferential surface
76a, 76b magnet receiving slots
77 slot pairs
78a, 78b, 78c, 78d elongated holes
80a, 80b, 80c, 80d plate sections
81, 81a, 81b, 81c, 81d inner holes
82, 82a, 82b, 82c, 82d intermediate holes
83, 83a, 83b, 83c, 83d outer holes
84a, 84c connecting slots
85 hole set
86 radially innermost slot edges
88 stepped channel
90 axially extending channel
90a innermost diameter
90b outermost diameter

What is claimed is:

1. An electric motor comprising:
a rotor rotatable about a center axis, the rotor including a plurality of magnets and a plurality of radially extending channels extending radially outward from an innermost circumferential surface of the rotor while extending axially and circumferentially in the rotor to provide fluid to the magnets,
the rotor being formed by a plurality of plates stacked in an axial direction, each of the plates including holes extending axially therethrough, the radially extending channels being formed by the holes, at least some of the holes each being circumferentially and radially offset from adjoining holes of directly axially adjacent plates, each of the plates including magnet receiving slots extending axially therethrough, the magnet receiving slots receiving the magnets.

2. The electric motor as recited in claim 1 wherein the radially extending channels have a stepped configuration.

3. The electric motor as recited in claim 2 wherein the circumferentially and radially offset holes form the radially extending channels by the hole in each consecutive one of the plates in the axial direction being progressively further radially outward from the center axis.

4. The electric motor as recited in claim 2 wherein the plates have an identical configuration and are rotationally oriented such that each of the plates has a different rotational orientation than a directly axially adjacent one of the plates.

5. The electric motor as recited in claim 4 wherein each of the plates is rotationally offset from the directly axially adjacent plate by a same angle.

6. An electric motor comprising:
a rotor rotatable about a center axis, the rotor including a plurality of magnets and a plurality of radially extending channels extending radially outward from an inner circumferential surface of the rotor to provide fluid to the magnets,
the rotor being formed by a plurality of plates stacked in an axial direction, each of the plates including holes extending axially therethrough, the radially extending channels being formed by the holes, each of the plates including magnet receiving slots extending axially therethrough, the magnet receiving slots receiving the magnets,
wherein the radially extending channels have a stepped configuration,
wherein the holes are partially radially overlapping holes,
wherein the radially overlapping holes form the radially extending channels by the hole in each consecutive one of the plates in the axial direction being progressively further radially outward from the center axis,
wherein the plates have an identical configuration and are rotationally oriented such that each of the plates has a different rotational orientation than a directly axially adjacent one of the plates,
wherein each of the plates is rotationally offset from the directly axially adjacent plate by a same angle,
wherein each of the plates includes a plurality of circumferential sectors, each of the sectors includes a plurality of the holes, the holes of each circumferential sector having a different configuration.

7. The electric motor as recited in claim 6 wherein the plates have a repeating pattern of rotational offset based on a number of the circumferential sectors.

8. The electric motor as recited in claim 6 wherein each of the sectors includes a plurality of hole sets, each of the hole sets including a same number of the holes of the sector, each of the hole sets of each of the sectors having a same configuration that is specific to the respective sector.

9. The electric motor as recited in claim 1 wherein the rotor includes axially extending channels, the radially extending channels extending radially outward from the inner circumferential surface of the rotor to the axially extending channels.

10. The electric motor as recited in claim 9 wherein the axially extending channels are radially inward from the magnets.

11. The electric motor as recited in claim 10 wherein the rotor includes connecting slots, the connecting slots extending from the axially extending channels to the magnet receiving slots.

12. The electric motor as recited in claim 11 wherein the magnet receiving slots are arranged in pairs, each of the pairs including a first magnet receiving slot and a second magnet receiving slot, the connecting slots including first connecting slots and second connecting slots, the first connecting slots extending from the axially extending channels to the first magnet receiving slots and the second connecting slots extending from the axially extending channels to the second magnet receiving slots such that each of the axially extending channels includes at least one of the first connecting slots and at least one of the second connecting slots extending therefrom.

13. The electric motor as recited in claim 9 wherein a plurality of the radially extending channels extends into a same one of the axially extending channels.

14. The electric motor as recited in claim 13 wherein the plurality of the radially extending channels extending into the same one of the axially extending channels are axially offset from each other.

15. The electric motor as recited in claim 1 further comprising a rotor carrier including radially extending holes passing therethrough to provide fluid to the inner circumferential surface of the rotor.

16. A hybrid module configured for arrangement in the torque path upstream from a transmission and downstream from an internal combustion engine, the hybrid module comprising:
an electric motor comprising a rotor rotatable about a center axis, the rotor including a plurality of magnets and a plurality of radially extending channels extending radially outward from an inner circumferential surface of the rotor to provide fluid to the magnets, the electric motor further comprising a rotor carrier including radially extending holes passing therethrough to provide fluid to the inner circumferential surface of the rotor; and
a torque converter including a front cover, the rotor carrier being fixed to the front cover.

17. The electric motor as recited in claim 5 wherein each of the plates includes a plurality of circumferential sectors, each of the sectors includes a plurality of the holes, the holes of each circumferential sector having a different configuration.

18. The electric motor as recited in claim 17 wherein the plates have a repeating pattern of rotational offset based on a number of the circumferential sectors.

19. The electric motor as recited in claim 17 wherein each of the sectors includes a plurality of hole sets, each of the hole sets including a same number of the holes of the sector, each of the hole sets of each of the sectors having a same configuration that is specific to the respective sector.

* * * * *